Nov. 13, 1934.                H. E. DENNIE                1,980,389
                              HOSE COUPLING
                      Filed March 9, 1933      2 Sheets-Sheet 1
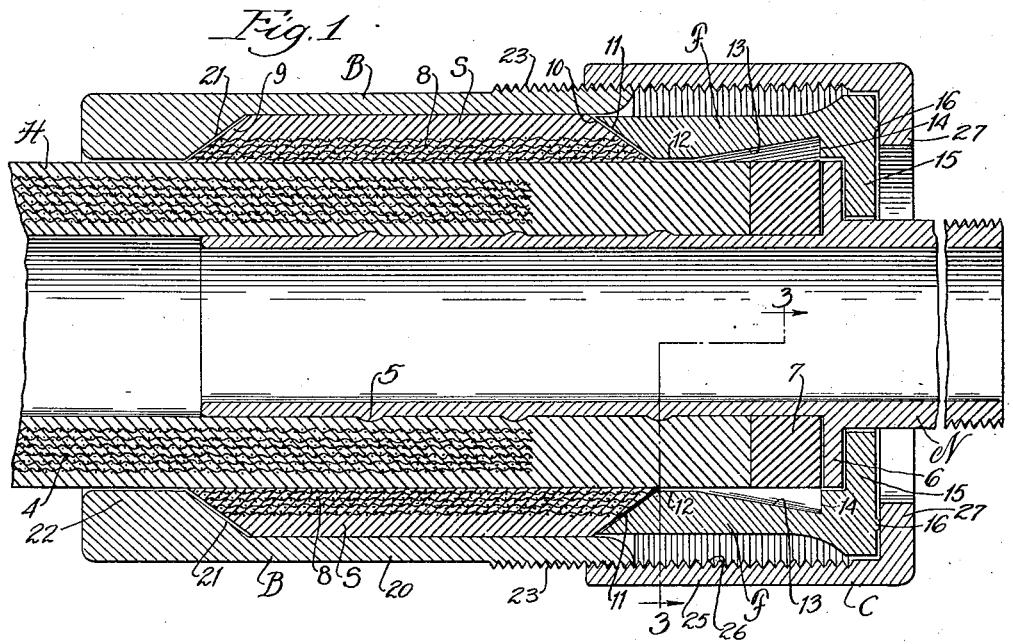
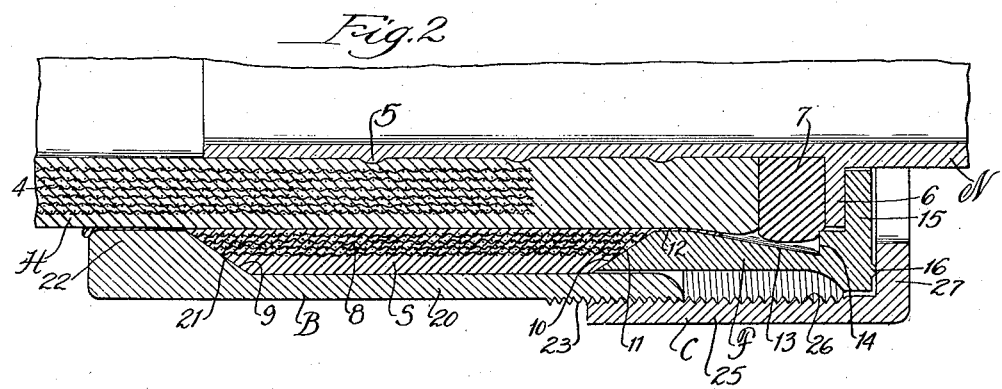
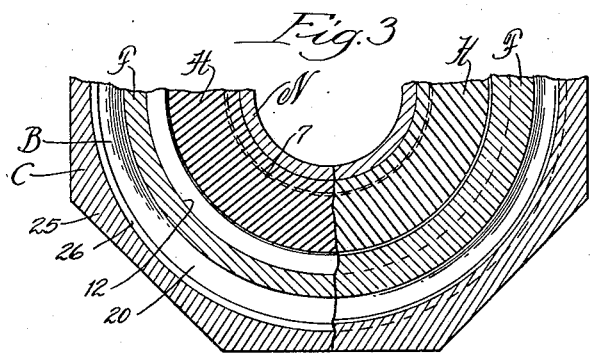
Inventor:
Harry E Dennie,
By Banning & Banning
      Attys.

Nov. 13, 1934.  H. E. DENNIE  1,980,389
HOSE COUPLING
Filed March 9, 1933    2 Sheets-Sheet 2
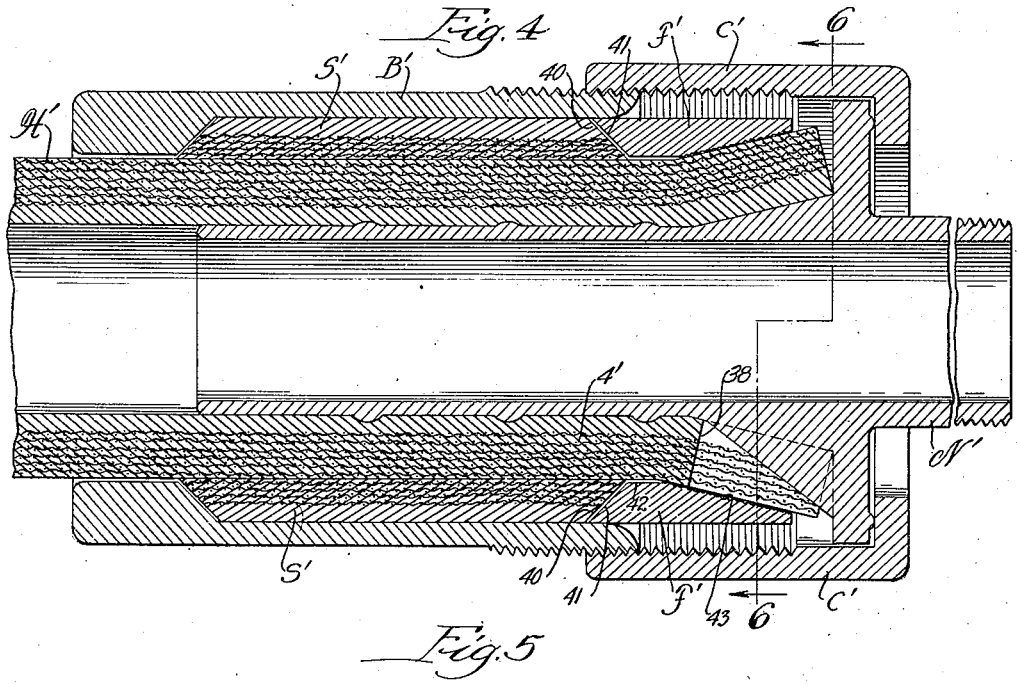
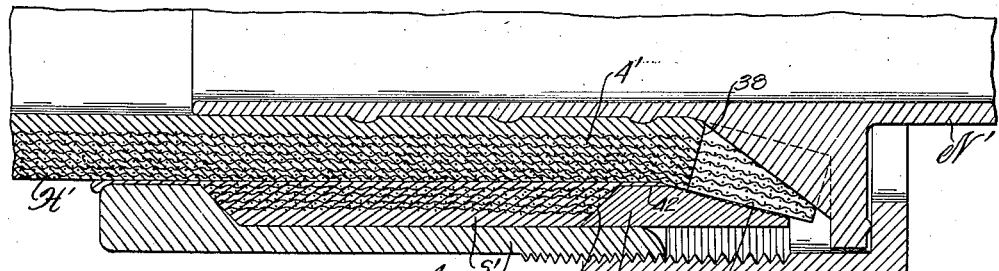
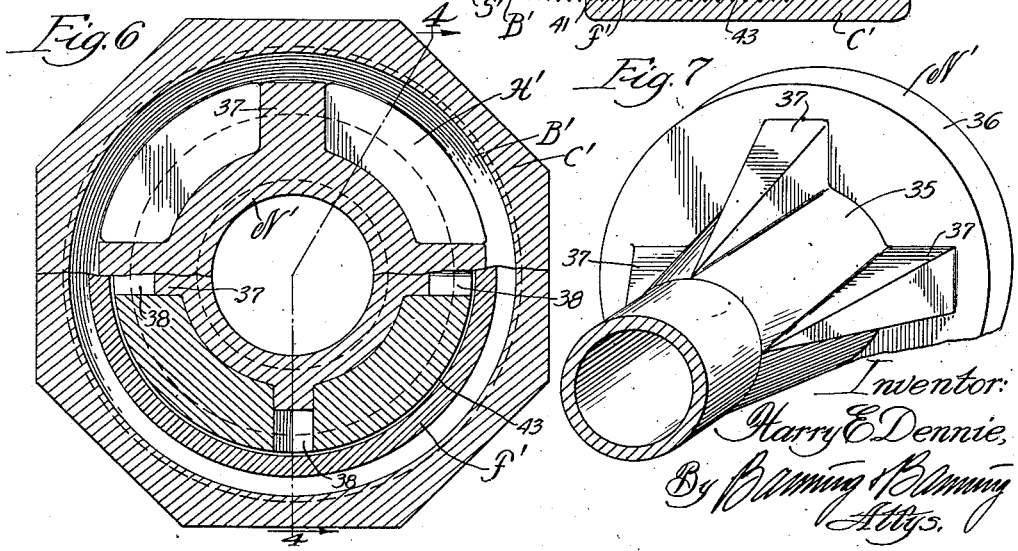

Patented Nov. 13, 1934

1,980,389

UNITED STATES PATENT OFFICE 1,980,389

HOSE COUPLING

Harry E. Dennie, Chicago, Ill.; Essie L. Dennie, executrix of said Harry E. Dennie, deceased Application March 9, 1933, Serial No. 660,149

3 Claims. (Cl. 285—86)

The present improvements have to do with a coupling for a hose capable of withstanding high pressures—perhaps 2000 pounds, or more. In applying a coupling to a hose which carries high pressures, considerable difficulty is encountered in making the connection leak-proof. The improved coupling, as herein disclosed, has the advantages of being simple, sturdy, relatively inexpensive, and above all, leak-proof, due to the construction and organization of its several parts which combine to produce a full and equal pressure upon the hose at every point circumferentially thereof when fitted to a nozzle or other connection.

Certain suggestive embodiments of my invention are set forth in the accompanying drawings wherein—

Figure 1 which is a central longitudinal section through the coupling and the proximate ends of an associated hose and nipple shows the parts, with exaggerated clearness therebetween, prior to compression;

Fig. 2 is a similar, but fragmentary, view showing the same parts as they may appear under compression;

Fig. 3 is a transverse section on the offset plane of line 3—3 of Fig. 1;

Fig. 4 is a longitudinal section along the line 4—4 of Fig. 6, showing a modified construction;

Fig. 5 which is a similar, but fragmentary, view of this constrtuction, shows the parts as they may appear under compression;

Fig. 6 is a transverse section on the offset plane of line 6—6 of Fig. 4; and

Fig. 7 is a detail in perspective showing the nipple flange as used with the construction of Figs. 4 to 6.

Considering first the coupling illustrated in Figs. 1 to 3, I have shown a hose H of suitable construction for carrying high pressures. It may optionally be provided with a reinforcement of braided wire 4 embedded in its structure, but in such event it is desirable that this reinforcement terminate short of its end, as indicated in Figs. 1 and 2. Interiorly the hose may be lined with a rubber tubing, as is common practice, and, if desired, a rubber cover may be applied exteriorly thereof. With details such as these, this invention is not particularly concerned.

As illustrated in Fig. 1, an end of the hose is fitted over one end of a nipple N. Such a nipple may have circumferential ribs 5, making for a tighter fit between the hose and nipple. The hose is fitted over the nipple to a point where its end is relatively close to a flange 6 which is extended circumferentially around the nipple. As shown, the hose end is spaced from this flange a distance sufficient for the accommodation of a ring 7 which is desirably made of soft rubber or rubber gum. This ring serves, in effect, as a cap for the hose end, being of the same diameter therewith both internally and externally.

Fitted around the hose and over the region thereof which overlies the nipple is an elastic sleeve S desirably made of rubber with an embedded reinforcement 8 of duck or other appropriate material. The sleeve ends 9 and 10 are inclined outwardly to provide opposite bevels, as shown. In cooperation with the sleeve end 10, which may conveniently be termed the forward end, is a follower gland F having its rear end 11 undercut to provide a bevel corresponding to the adjacent sleeve end with which it coacts. The follower gland which extends continuously around the hose is provided with a cylindrical inner surface 12 which lies proximate to the hose near its end, and with an inclined surface 13 which recedes away from the hose and the cap at its end. The inclined surface of the follower extends forwardly for jointure with a face 14 which lies in a plane transversely of the axis of the hose to form part of a shoulder overlying the flange 6 of the nipple. Forwardly of this shoulder the follower terminates in a flange 15 which lies forwardly of the nipple flange. On the forward face of the flange 15 is an annular rib 16.

I provide in association with the parts just described a body for the coupling in the form of a housing B. As shown, this housing comprises a cylindrical wall 20 which closely surrounds the sleeve S with its rearward end interiorly beveled at 21 for coaction with the adjacent beveled end 9 of the sleeve. The rear end of the housing terminates in a wall 22 which extends closely along the hose for an appreciable distance.

The forward end of the housing which extends just beyond the sleeve and beyond the proximate end of the follower, is exteriorly threaded as at 23. In cooperation with these threads, is a coupling member C having a cylindrical wall 25 formed with internal threads 26 for screw-threaded engagement with the housing at its forward end. As shown, the coupling extends forwardly to a point beyond the follower gland and there terminates in a flange 27 which is inwardly extended to lap over the proximate end of the gland for engagement with its rib 16.

The general relationship of the several parts of the present coupling, prior to compression, is indicated in Fig. 1. Here it will be noted that a small space exists between the hose and cap on the inside and the gland on the outside. The fit between the remaining parts, although relatively close, is hardly such as to prevent leakage of fluid material therebetween.

The coupling in its entirety provides a joint between the hose and nipple which is leak-proof, this being accomplished when compression forces are set up in response to tightening of the coupling member on the housing. When this takes place, there is no travel of the coupling or of the gland, but the housing is drawn forwardly, thereby compressing the elastic sleeve between the opposing beveled faces of the housing and gland. In this operation of tightening, the forces of compression are exerted directly upon the sleeve both longitudinally and radially. Upon the hose these forces are applied indirectly in substantially a radial direction alone, with a resulting tendency to elongate the hose and thereby compress its soft rubber cap. As a consequence of this compression, the sleeve also will tend to elongate to the extent that some of it will be forced endwise to form a seal between the housing and the hose exterior and also between the hose and the follower gland. In response to elongation of the hose, its soft capped end will be compressed endwise with a resulting radial expansion which will fill partially or otherwise the space interiorly of the follower gland, as suggested in Fig. 2, thereby producing a seal between the gland and nipple.

A suggestive modification of a structure embodying my invention is shown in Figs. 4 to 7. Here I utilize a hose H', sleeve S', housing B' and coupling member C' which may be similar in all substantial respects, to the corresponding parts in the construction already explained. The nipple N', while generally the same, is enlarged adjacent its flange 36 in the form of a cone 35 whereon are certain longitudinal ribs 37 (see Fig. 7) each tapering toward a point in the direction of the hose end which is slitted as at 38. Desirably the embedded reinforcement 4' is extended to the hose end as here shown, and the several slits 38, of which there is one for each rib, extend back from the hose end a distance about equal to the length of the ribs. A hose and nipple so formed may be joined one to the other in the manner indicated, the hose end being outwardly flared when forced upon the cone enlargement with a consequent diverging distention of its slits which thereupon fit closely alongside of the tapered ribs. With such a construction I use a follower gland F' having its rear end undercut to provide a bevel 41 which coacts with the proximate beveled end 40 of the elastic sleeve, and provided also with a cylindrical inner surface 42 which lies proximate to the hose just rearwardly of its flaring end. The follower is further provided with a slanting inner surface 43, preferably serrated or roughened to increase its frictional gripping power, corresponding to the flaring end of the hose over which the follower is tightly fitted, as shown.

With the parts fitted to each other, as shown in Fig. 4, the coupling member is ready to be tightened upon the housing. When this takes place, the elastic sleeve is compressed endwise between opposing beveled faces of the housing and follower gland, with a consequent radial compression exerted upon the hose. In this operation the follower which is tightly rested upon the flaring hose end remains stationary, or substantially so, but in response to advance of the housing, consequent upon tightening of the coupling member, the follower gland exerts upon the flaring hose end a force which tends to advance and hold the latter tightly upon the coned enlargement of the nipple. The compression to which the hose is thus subjected tends to elongate the hose end both longitudinally and circumferentially, thereby maintaining its end closely against the nipple flange and its slitted faces closely against the tapered ribs. The connection thus made is both tight and leak-proof.

It is to be noted that the present hose coupling is so designed as to minimize the spaces or openings through which leaks might occur. In addition, means are provided for sealing each of these passages when compressive forces are set up. These forces are exerted equally at every circumferential point and uniformly both longitudinally and radially of the coupling. The sleeve which applies compressive forces to the hose is itself elastic so as to move with the hose as it elongates, thereby closing every gap. The precise form, arrangement and design of the several parts entering into the construction of this coupling may be modified within considerable limits so long as the principles of this invention are utilized, as defined by the claims following:

I claim:

1. A coupling in which is comprised a nipple having a conical enlargement the base of which terminates adjacent a radial flange, the nipple being adapted to receive thereover one end portion of a hose which is longitudinally slitted to facilitate flaring of the hose end portion when forced upon the conical enlargement of the nipple, ribs extending along the conical enlargement and tapering toward the smaller end thereof to lie within the slits of the hose end portion, a follower gland surrounding the hose having its rear end undercut to provide a bevel and its forward end internally tapered to fit over the flaring end portion of the hose, an elastic sleeve surrounding the hose having opposed beveled ends one in coaction with the beveled end of the follower gland, a housing surrounding the elastic sleeve having a beveled wall for coaction with the beveled end of the sleeve remote from the follower gland, and a coupling member engaging the nipple flange in screw-threaded connection with the housing adapted, upon advance, to draw the housing endwise against the elastic sleeve whereby to compress the latter endwise with a consequent radial compression upon the hose.

2. The combination with a hose having one end portion formed with longitudinal slits, of a coupling comprising a nipple formed with a conical enlargement adjacent a radial flange, adapted to be fitted within the hose the slitted end portion whereof is outwardly flared when forced upon the conical enlargement of the nipple, means carried by the nipple extending within the several slits in the hose end portion, and relatively movable pressure means including two screw connected parts enclosing the hose end portion adapted, upon advance, to compress the hose and force the end thereof into tight engagement with the nipple flange and the hose walls adjacent the slits into tight engagement with the means extending therewithin.

3. A coupling in which is comprised a nipple having a radial flange which lies adjacent the base of a conical enlargement on the nipple, the nipple being adapted for tight fitting within a hose whose end portion is longitudinally slitted for a distance substantially the same as the length of the conical enlargement on the nipple whereby the nipple end portion is required to flare outwardly when forced to position over the nipple, means carried by the nipple extending within the several slits at the end thereof for close fit against the hose sides adjacent the slit, and means in connection with the nipple for compressing the hose in place thereupon, said means exerting a pressure upon the hose end portion such as to elongate the hose both longitudinally and circumferentially into tight fitting engagement with the flange of the nipple and the means extended between the slits of the hose.

HARRY E. DENNIE.